No. 671,831. Patented Apr. 9, 1901.
E. LOESSER.
ART OF WORKING DIAMONDS.
(Application filed July 26, 1900.)
(No Model.)
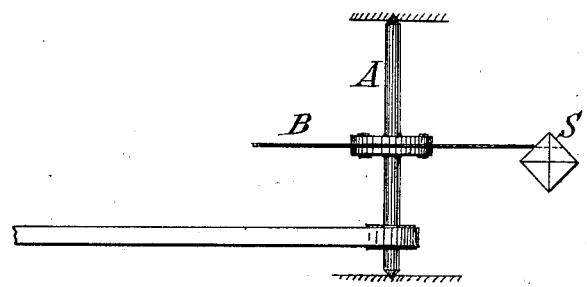
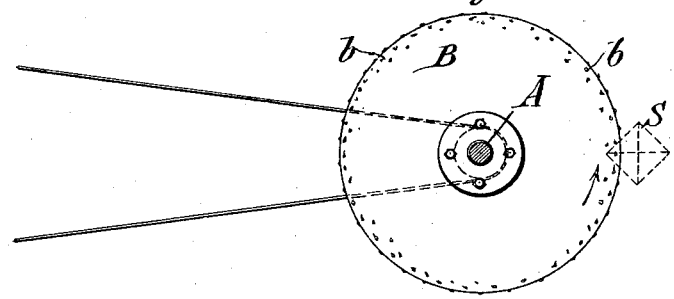
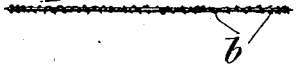
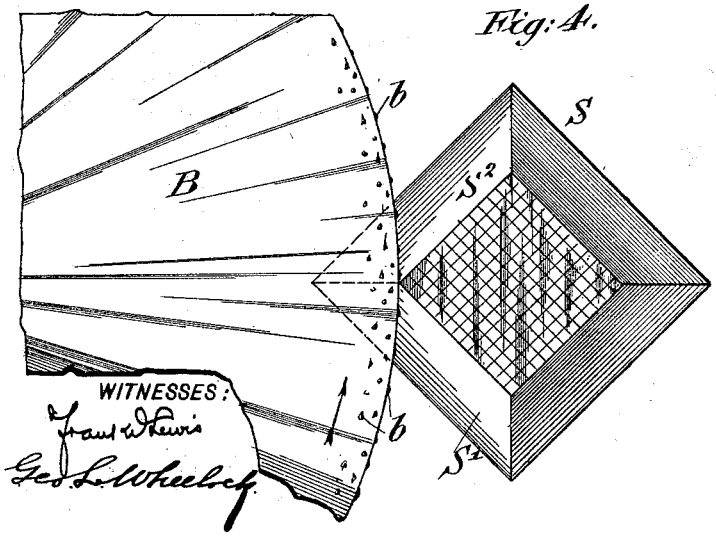
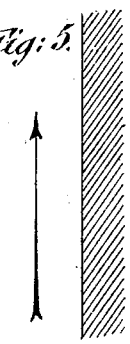
WITNESSES:
INVENTOR
Ernest Loesser
BY
ATTORNEYS

UNITED STATES PATENT OFFICE.

ERNEST LOESSER, OF NEW YORK, N. Y.

ART OF WORKING DIAMONDS.

SPECIFICATION forming part of Letters Patent No. 671,831, dated April 9, 1901.

Application filed July 26, 1900. Serial No. 24,917. (No model.)

*To all whom it may concern:*

Be it known that I, ERNEST LOESSER, a citizen of the United States, residing in the city of New York, borough of Manhattan, and State of New York, have invented certain new and useful Improvements in the Art of Working Diamonds, of which the following is a specification.

For a number of centuries in the manufacturing of diamonds the workman had to resort to the tedious and slow reduction or grinding off of parts of the stone before the stone was reduced to shape for polishing, and this process of grinding down a stone is called "cutting." Sometimes a portion of considerable size had to be gradually ground off in this way before it was possible to produce a diamond shape or brilliant effect on the main body of the stone. The diamond-dust produced possesses some value; but it represents only a small portion of the parts removed and is not anywhere near the value of a single piece from which the equivalent quantity of dust could be produced and which piece removed would be of sufficient size to form a brilliant or which can even be fashioned into a small "rose." Most of the parts removed go off into the air in the form of useless powder. In a factory which turns out a large quantity of cut and polished diamonds the loss represented by the difference in value of the valuable dust and the equivalent fragmentary portions of the stone which could be saved without reducing them to dust amounts to considerable, and, in fact, a comparison of the values is hardly conceivable. At present there are no other processes known to the diamond manufacturers than that of cleavage for the reduction of a stone, by which small particles of the stone are removed, and the process of grinding down the stone to produce the facets, by which a considerable quantity of dust is produced.

Prior to my invention it had never been supposed that a diamond could be cut in two by a sawing or direct cross-cutting process; but this is what is done under my present invention for the purpose of reducing diamonds to a better size for being worked up into brilliant shape, especially by removing and saving a fragment which can be fashioned into a small brilliant or rose.

My process comes into practice after that of cleaving and does away largely with both cutting and "polishing."

My invention comprehends the method of removing a portion of a diamond while preserving the integrity of the removed portion and at the same time partly finishing a face of the stone, which consists, essentially, in starting the cut at a corner or angle of the diamond, continuing said cut through that part of the stone in a plane at an angle to the grain or planes of cleavage of the stone, and at the same operation polishing both surfaces of the cut, all as particularly described hereinafter in detail and then particularly claimed.

In the accompanying drawings, Figure 1 is a side elevation of a primitive form of device adapted to saw or cut through the diamond, the same being sufficient to enable a clear understanding of the method forming the present invention. In this view a corner of a stone just above the girdle is shown as presented to the cutter. Fig. 2 is a plan view of the cutting-disk employed in my method. Fig. 3 is a transverse section thereof. Fig. 4 is a diagrammatic view showing highly magnified the graining of a diamond which has been cut through and in addition showing the relative position of the diamond to the cutter when first presented to the cutter. Fig. 5 is a diagrammatic view showing the grain of a diamond in which an arrow indicates the direction of the motion of the cutter, so as to illustrate the action of the cutter in forcing the dust toward the spaces between the layers; and Figs. 6 and 7 are detailed perspective views of the removed fragmentary portion of the stone and of the main body of the stone, which has been cut or sawed through and its cut surface polished.

Similar letters of reference indicate corresponding parts.

Referring to the drawings, A indicates a suitable driving-spindle, and B a cutting-disk mounted on said spindle. This cutting-disk is about as thin as a sheet of writing-paper, and while it has a knife-edge it has at the same time minute or microscopic teeth, and hence to distinguish the present invention from the well-known diamond-cutting work the action of the cutter may be termed a "sawing" one. The cutter is made of a metal, such as phosphor-bronze, which is of low heat-retaining property, and this is essential because great heat is produced in sawing through such a hard stone as a diamond. The heat has no practical softening action on the cutter, so that the diamond can always be cut through and through.

In my copending application, Serial No. 715,304, filed May 2, 1899, a machine is described in detail in which a cutting-disk is shown and which enables the carrying out of the method forming the subject of the present invention. The cutting-disk of the present invention differs slightly from that disclosed in said application in that there are a number of very small diamond-grits embedded in the edge and sides of the cutter, and these are indicated by the letter $b$. The object of these will appear hereinafter. All diamonds are generally formed regularly in the form of octahedrons or rhombic decahedrons, in which each of the sides has a distinct grain of its own, which is not parallel with the grain of any other side except the opposite parallel side. This enables what is known as "cleaving;" but in order to produce the facets, table, or cullet "culasse" on a stone it is necessary to polish against the grain, for a diamond cannot be polished except against the grain. Hence to do this the facets must be cut at a slight angle, at least, to the grain, while the table and cullet are cut at a greater angle to the grain. This necessitates the removal of a considerable portion of the stone, and therefore a great reduction in the value of the parts removed.

In the present invention (see particularly Figs. 1 and 4) a corner of a stone S is held up to the edge of the cutter B, so that the plane of the cutter will be in the plane of the surface which is to be produced thereby.

It has been found practically impossible to cut or saw directly through the thicker portion of the stone, even with a metallic cutter having a low heat-retaining quality. When a cutter of this quality, however, is revolved at a very high rate of speed and one corner of the stone presented to the cutter, the latter will pass clear through the stone and without destroying its integrity cut or saw off the fragment which heretofore, in order to produce the flat table formed by the cross-cut, had to be gradually and very slowly ground down, producing powder which flies into the air and is of no commercial value.

Referring to Fig. 4, it will be seen that the side S' of the stone has a grain which lies in planes extending substantially in the direction of motion of the cutter B, so that the grain parallel with that side of the stone offers slight resistance to the cutter, while the grain at the side $S^2$ of the corner which is being cut lies in planes which are directed toward the direction of the motion of the cutter B. This disposition of the grain at $S^2$ greatly facilitates the polishing of the stone, because the diamond-dust which is produced is directed toward the edges of the layers at $S^2$ and the dust has a tendency to be detained in the spaces which exist between the edges, and thereby a polishing of the surface which is being cut or sawed off is produced. The farther the cutter cuts through the stone the hotter the stone becomes, thus acting to expand the grain of the stone and causing the particles of stone—that is to say, the diamond-dust—to act on the edges of the grain more rapidly, so that the through-and-through cutting is facilitated.

It should be understood that the diamond-grits $b$ in the edge and sides of the cutter facilitate the clearance of the cutter through the stone, inasmuch as the said grits project slightly from the opposite surfaces of the cutter, so that they take the place of the "set" of the ordinary saw. Without this the cutter could not pass through the stone.

In Fig. 5 the grain of the stone is shown enlarged for the purpose of illustrating the manner in which the polishing takes place by means of the cutter, which moves toward the edges of the grain. The polishing produced by the action of the cutter does away to a great extent with the usual polishing which is done by the lap or polishing disk.

After severing the stone the parts are worked up in the usual manner for producing brilliants or other styles.

Having thus described my invention, what I claim as new, and desire to secure by Letters Patent, is—

1. The method of removing a portion of a diamond while preserving the integrity of the removed portion, and at the same time partly finishing a face of the stone, which consists essentially in starting the cut at a corner or angle of the diamond, continuing said cut through that part of the stone, in a plane at an angle to the grain or planes of cleavage of the stone, and at the same operation polishing both surfaces of the cut.

2. The method of removing a portion of a diamond while preserving the integrity of the removed portion, and at the same time partly finishing a face of the stone, which consists essentially in starting the cut at a corner or angle of the diamond, continuing said cut through that part of the stone, in a plane at an angle to the grain or planes of cleavage of the stone, whereby the same is heated and the grain expanded, and at the same operation polishing both surfaces of the cut by the working of the diamond-dust against the edges of the grain.

In testimony that I claim the foregoing as my invention I have signed my name in presence of two subscribing witnesses.

ERNEST LOESSER.

Witnesses:
PAUL GOEPEL,
GEO. L. WHEELOCK.